United States Patent [19]

Theusner et al.

[11] Patent Number: 5,628,956
[45] Date of Patent: May 13, 1997

[54] METHOD FOR MANUFACTURING A RUBBER ARTICLE

[75] Inventors: Martin Theusner, Gehrden; Hans-Hinrich Rickert, Korbach-Eppe, both of Germany

[73] Assignee: Continental Aktiengesellschaft, Hanover, Germany

[21] Appl. No.: 399,100

[22] Filed: Feb. 24, 1995

[30] Foreign Application Priority Data

Mar. 15, 1994 [DE] Germany ............... 44 08 793.4
Feb. 9, 1995 [EP] European Pat. Off. ......... 95101775

[51] Int. Cl.⁶ .................................... B29C 35/00
[52] U.S. Cl. .................. 264/438; 264/130; 264/131; 264/315; 264/326; 427/475; 427/476; 427/485
[58] Field of Search ............... 264/437, 438, 264/130, 131, 315, 326, 517, 500; 427/458, 469, 475, 476, 485

[56] References Cited

U.S. PATENT DOCUMENTS

| | | | |
|---|---|---|---|
| 3,595,950 | 7/1971 | Mezynski | 264/130 |
| 3,932,107 | 1/1976 | Proudfit | 425/509 |
| 4,183,887 | 1/1980 | Karg | 264/131 |
| 4,285,897 | 8/1981 | Zakaria et al. | 264/130 |
| 4,889,677 | 12/1989 | Hashimoto et al. | 264/315 |
| 4,908,225 | 3/1990 | Niimura et al. | 427/485 |
| 5,073,579 | 12/1991 | Macholdt et al. | 427/485 |
| 5,344,672 | 9/1994 | Smith | 427/485 |
| 5,464,586 | 11/1995 | Wagner | 264/130 |

FOREIGN PATENT DOCUMENTS

| | | |
|---|---|---|
| 293902 | 10/1971 | Austria . |
| 0141087 | 5/1985 | European Pat. Off. . |
| 818419 | 10/1951 | Germany . |
| 3330505 | 2/1988 | Germany . |
| 4228194 | 3/1994 | Germany . |
| 4234497 | 4/1994 | Germany . |
| 51-003496 | 2/1976 | Japan . |
| 56-101840 | 8/1981 | Japan . |
| 979158 | 12/1982 | U.S.S.R. . |
| 1229067 | 5/1986 | U.S.S.R. . |

*Primary Examiner*—Mathieu D. Vargot
*Attorney, Agent, or Firm*—Robert W. Becker & Associates

[57] ABSTRACT

A method of manufacturing a rubber article includes the steps of shaping a green article and blowing a solvent-free powdery release agent made of powder particles onto the green article in order to coat the green article with the release agent. The release agent contains at least 10% vulcanized rubber powder and a compound preventing rubber adhesion within the release agent. During blowing an electrostatic potential difference is provided between the green article and the release agent for driving the powder particles of the release onto the green article. The green article coated with the release agent is subsequently placed into a vulcanization mold where the green article is vulcanized.

21 Claims, 1 Drawing Sheet

METHOD FOR MANUFACTURING A RUBBER ARTICLE

BACKGROUND OF THE INVENTION

The present invention relates to a method for manufacturing a rubber article whereby first a green article is shaped, coated with a release agent, and then placed into a vulcanization mold and vulcanized.

It is conventional to apply a release agent in the form of a liquid mixture to the green article. This release agent contains a considerable amount of solvents. These solvents are released into the environment even when using a solvent recycling apparatus. Recycling methods for solvents are difficult to perform. Even when water is used as the solvent, a pollution of the environment, in this case by waste water, cannot be avoided completely.

It is therefore an object of the present invention to reduce the environmental pollution resulting from the application of release agents, preferably to completely eliminate such environmental pollution.

SUMMARY OF THE INVENTION

A method of manufacturing a rubber article, preferably a vehicle tire, according to the present invention is primarily characterized by:

Shaping a green article;

Blowing a solvent-free powdery release agent comprised of powder particles onto the green article in order to coat the green article with a release agent, the release agent comprising at least 10% of vulcanized rubber powder and a compound preventing rubber adhesion within the release agent;

Providing during blowing an electrostatic potential difference between the green article and the release agent for driving the powder particles of the release agent onto the green article;

Placing the green article coated with the release agent into a vulcanization mold; and Vulcanizing the green article.

Preferably, the compound preventing rubber adhesion is a fine powder.

Advantageously, the compound prevent rubber adhesion is silica gel.

Expediently, the release agent comprises at least 2% silica gel and a product of percentage of silica gel and the surface area of the silica gel in $m^2/g$ is at least 500. For example, for an amount of 2% silica gel the surface area would be 250 $m^2/g$ and for an amount of 4% silica gel the surface area would be 125 $m^2/g$.

Preferably, the silica gel has a surface area of at least 100 $m^2/g$. The especially preferred range of surface area is 200 to 400 $m^2/g$.

Advantageously, the step of blowing includes the step of applying the release agent to the exterior surface of the green article. The release agent in this embodiment preferably comprises at least 90% vulcanized rubber powder.

In another embodiment of the present invention the step of blowing includes the step of applying the release agent to the interior surface of the green article, and the release agent in this embodiment preferably comprises 5 to 30% vulcanized rubber powder.

Preferably, the step of blowing includes the step of applying the release agent to the interior surface of the green article. In this embodiment the release agent preferably comprises 5 to 30% silica gel.

In yet another embodiment of the present invention the step of blowing includes the step of applying the release agent to the exterior surface of the green article, wherein the release agent preferably comprises up to 6% silica gel.

In a preferred embodiment of the present invention the method further comprises the step of producing the vulcanized rubber powder from rubber mixtures containing anti-aging compounds but being free of fibers and butyl rubber.

Advantageously, the release agent further comprises at most 5% carbon black and at most 8% graphite.

In a preferred embodiment of the present invention the step of blowing includes the step of applying the release agent to the exterior surface of the green article. The release agent comprises preferably exclusively silica gel and vulcanized rubber powder and is free of carbon black, graphite and solvents. Advantageously, the release agent comprises up to 6% silica gel.

In yet another embodiment of the present invention the step of blowing includes the step of applying the release agent to the exterior surface and the interior surface of the green article, wherein the release agent applied to the exterior surface has a composition that is different from the composition of the release agent applied to the interior surface. Advantageously, the release agent applied to the exterior surface is free of mica. Expediently, the release agent applied to the interior surface contains 15 to 50% mica. In the alternative, the release agent applied to the interior surface contains 15 to 50% talcum. It is also possible that the release agent to be applied to the interior surface contains mica and talcum in a combined amount of 15 to 50%.

Preferably, the step of blowing includes the step of applying the release agent to the exterior surface and the interior surface of the green article, wherein for applying the release agent to the exterior surface a first jet or nozzle is used and for applying the release agent to the interior surface a second jet or nozzle is used. Advantageously, the release agent applied to the exterior surface has a composition that is different from the composition of the release agent applied to the interior surface.

Expediently, the step of blowing is carried out with a stream of gas, preferably a stream of air.

According to the present invention it is suggested that after shaping a solvent-free powder of a release agent is applied onto the green article with a stream of gas, preferably a stream of air and during blowing of the solvent-free powder an electrostatic potential difference between the green article and the solvent-free powder is provided which drives the powder particles of the release agent onto the surfaces of the green article. The solvent-free powder is a mixture that contains at least 10% vulcanized rubber powder and as a further component especially fine powdery materials that prevent adhesion of rubber within the release agent, preferably silica gel.

Preferably, the solvent-free release agent powder to be blown onto the green article is a mixture that contains at least 2% silica gel, wherein the product of the percentage of silica gel and of the specific surface area of the silica gel, given in $m^2/g$, is at least 500. When the silica gel is not available in the preferred form, i.e., having a high surface area relative to its mass of 250 $m^2/g$ (this property is also called activity), the silica gel must be added in greater amounts the smaller its surface area per gram is. The solvent-free release agent powder blown onto the green article should be a mixture that contains silica gel of a surface area per gram of at least 100 $m^2/g$, preferably 200 to 400 $m^2/g$.

Advantageously, the difference between the potential of the powder and the powder jet or nozzle, on the one hand, and of the green article to be coated with the release agent, on the other hand, should be between 15 and 90 kV. Of course, small potential values relate to small size green articles, where, due to the shorter distance possible between the powder jet and the green article and due to the corresponding shorter length of the field lines, a sufficient potential gradient [V/m] results with such smaller potential values. The higher potential values relate to green articles of larger sizes.

Before leaving the powder jet of devices that are known to a person skilled in the art, the powder should be brought to the same potential as the powder jets. This inhibits, due to the repulsion of like electric charges, the adhesion of powder particles, especially of the rubber particles. This measure, in addition to the use of the adhesion-reducing additives, especially silica gel, further improves the expedient and directed conveyance of the powder particles to the green article.

The blowing step should be performed in a chamber. When the potential of the chamber is between that of the powder jet and the green article, it should be in the vicinity of the value of the powder jet in order to thus minimize powder deposition within the chamber.

It is also possible that the potential between chamber and green article is selected to be greater than that between the powder jet and the green article. This prevents substantially completely any powder deposition within the chamber.

Preferably, the green article to be coated is grounded in order to prevent discharge currents during further processing.

Vulcanized rubber powder is finely ground rubber, i.e., vulcanized rubber in powder form. For the invention vulcanized rubber powder is extremely useful that results from milling of rubber below the glass transition temperature. When within such a temperature range, the rubber is brittle and the resulting cuttings have sharp edges. The sharp edges improve the release action of the release agent. It is also possible to provide a sufficient edginess to the particles by using a cutting tool that is operated at extremely high speeds instead of deep cooling the rubber which requires great amounts of energy. Cutting at high speeds is especially advantageous when the cutting process is performed in a cooling bath, for example in water.

The use of vulcanized rubber powder as a component of the release agent lowers the costs for disposal during tire manufacture without negative impacts on the working physiology and ecology. The vulcanized rubber powder also improves due to its roughness the required venting.

The vulcanized rubber powder is preferably produced from the outer layers of tire sidewalls and/or tire treads or from vulcanized remnants of such rubber mixture to be used for these tire components. Vulcanized rubber powder of this origin contains anti-aging compounds that are advantageous for products manufactured according to the present invention such as, for example, tire sidewalls exposed to UV radiation. The aforementioned rubber compositions are furthermore free of fibers and butyl rubber.

For coating the exterior surface of the green article by blowing the release agent thereon, it is suggested to use a vulcanized rubber powder contents of 90 to 98%. For coating the interior surface of the green article by blowing the release agent thereon it is suggested to use a vulcanized rubber powder contents of 5 to 30%. The vulcanized rubber powder contents should be lower for the interior surface because sufficient gliding properties between the green article interior surface and the conventionally used bellows (during vulcanization) should be provided in order to ensure a sufficient bellows service life and to prevent non-uniform displacement of the still viscous rubber. If these conditions are not ensured, the resulting product could exhibit untrue (unbalanced) running properties due to nonuniform rolling radii and/or non-uniform stiffness distribution and/or non-uniform mass distribution.

It has been shown that a silica gel contents between 2 and 6% for coating the exterior surface of the green article by blowing thereon the release agent is beneficial. Especially preferred is a contents of 3%. For the interior surface of the green article, on the other hand, a higher silica gel contents should be selected for improving the venting and gliding properties, namely 5% to 30%, preferably approximately 25%. In this context a smaller mass-related surface area of the silica gel can be useful, approximately in the range of about 100 $m^2/g$.

To the release agent to be used for coating by blowing the interior surface of the tire a small amount of graphite should be added for improving the gliding properties, preferably up to 8%, especially preferred approximately 5%. The release agent to be blown onto the exterior surface of the tire should not contain graphite.

It is also possible to add carbon black to the release agent carbon black is especially suitable when using the release agent on the interior surface of the tire, in order to provide a gray coloring and, in the case of an accidental spraying onto the exterior surface, to obtain the conventional, i.e., black, exterior appearance.

For performing the inventive method it is possible to use conventional powder coating devices that are known in the art for applying sinterable "lacquer" layers as a surface finish in the metal industry.

The surprising aspect of the present invention is that the non-metallic surface of a rubber article, especially of a tire, is suitable in connection with at least partially polar powder mixtures for performing such a powder coating process. The difference to the known powder coating processes used with metal parts is that in the present invention the application of a release agent serves to release the vulcanized product from the mold and is not intended to improve or finish the surface of the resulting finished product.

In order to provide for an exact fine-tuning or adjustment of the release agent powder mixture to requirements at a specific location of application, it is suggested to use different powder mixtures for the interior and exterior surfaces of the green article.

This is possible without any further cleaning expenditures, when different powder jets are used for coating the interior surface of the green article and the exterior surface of the green article.

The release agent powder mixture for the exterior coating of the tire should not contain carbon black or graphite or any solvents such as gasoline, i.e., should be exclusively comprised of vulcanized rubber powder and silica gel. Thus, the conventional appearance, the mat-black appearance of the exterior surface of tire expected by the customer, is maintained and any soiling of the workplace is prevented.

The present invention can, of course, also be used in connection with the manufacture of other rubber articles that are similar to tires, for example, air springs.

Tires that are produced with a outer coating of the green tire that contains graphite have in general a thin carbon-rich outer layer directly at their surface. In the area of the tread periphery this layer is worn off after driving only a few miles. In the area of the groove flanks the friction-reducing effect remains present over an extended period of time and may be beneficial in the context of European Patent Application 92 106 706 as a means against lodging of stones within the tread.

The release agent powder mixture to be used for the exterior surface contains advantageously no mica. In this manner, a very intensive mat-black appearance of the tire is ensured instead of the gray appearance that is undesirable. Since relative to the vulcanization mold only very few gliding movements occur, the friction-reducing effect of mica is not necessary at the outer surface.

On the other hand, for the coating of the interior surfaces, which are less important for the appearance of the tire, the powder mixture should contain ground mica so that the bellows and the sensitive sealing inner layer of the tire which is conventionally comprised of highly viscous butyl rubber is protected against the effect of great frictional forces.

BRIEF DESCRIPTION OF THE DRAWING

The object and advantages of the present invention will appear more clearly from the following specification in conjunction with the accompanying drawings, in which.

DESCRIPTION OF PREFERRED EMBODIMENTS

A preferred composition of the inventive release agent to be used especially for the interior surfaces of a tire is disclosed in the following:

25% mica

5% graphite

22% carbon black

24% vulcanized rubber powder

24% silica gel.

A preferred composition of an inventive release agent to be used for the exterior surface of a tire is disclosed in the following:

97% vulcanized rubber powder

3% silica gel.

When however a manufacture completely sealed relative to the environment is desired and no differentiation between the interior and the exterior coating is required, the following composition of an inventive release agent is suggested for both interior and exterior surfaces:

5% mica

5% carbon black

80% vulcanized rubber powder

10% silica gel, thus allowing for a facilitated return of the powder blown past the tire, since one must not deal with two different compositions.

Figure 1:
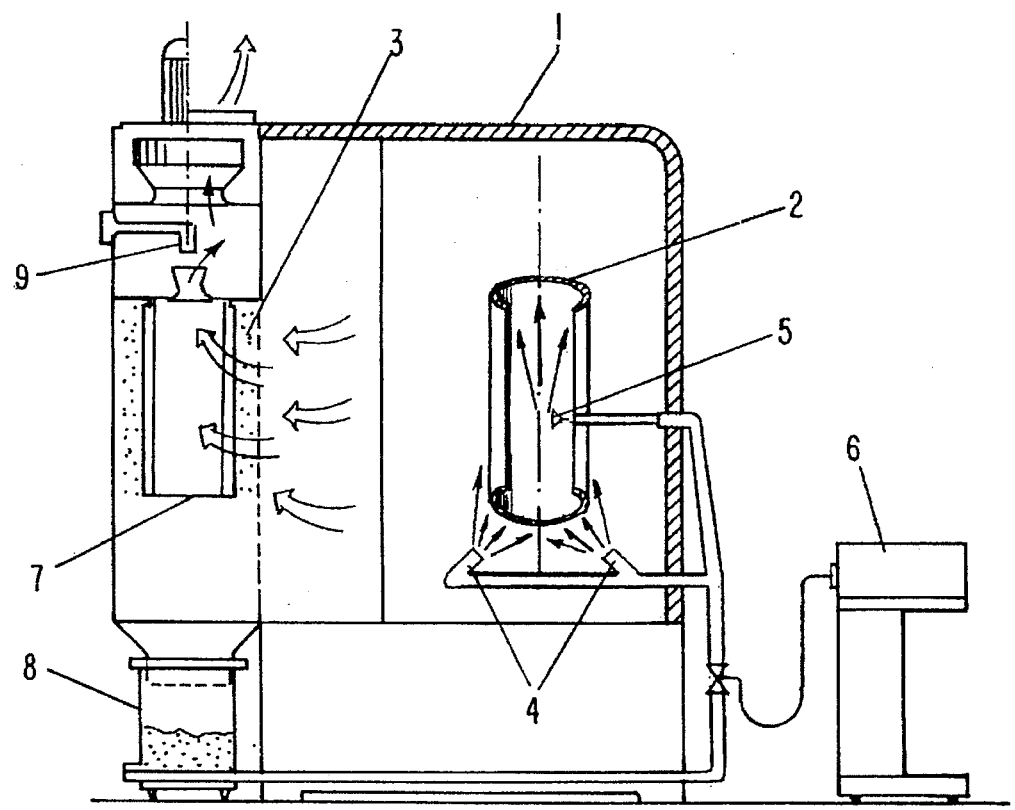
FIG. 1 shows a blowing chamber with a rubber tire.

FIG. 1 shows a blowing chamber 1 with a rubber article, in the shown embodiment a vehicle tire 2, arranged therein. The blowing chamber 1 is open at the rear and the front. By means of a suction opening 3 the surrounding air is maintained free of the solvent-free release agent powder. This arrangement enables the introduction of the green article to be coated and the removal of the green article coated with the release agent from the blowing chamber in order to transport it to the vulcanization mold.

Two powder jets 4 for blowing the release agent onto the exterior surface of the tire and one powder jet 5 for blowing the release agent onto the interior surface of the tire are provided within the blowing chamber. This low number of jets is sufficient when the green tire to be coated is turned during blowing.

Preferably, the loading of the blowing chamber and the control of the blowing process is carried out via a computer-based console 6 arranged in the vicinity of the blowing chamber.

The air is preferably sucked away, as shown, via a closable suction opening 3. This allows for an automated cleaning of the waste air filter 7 in the following manner. For cleaning the filter 7, the air stream is reversed while the suction opening 3 is closed so that the powder material released from the filter 7 cannot return into the blowing chamber, but is collected in the container 8.

Figure 2:
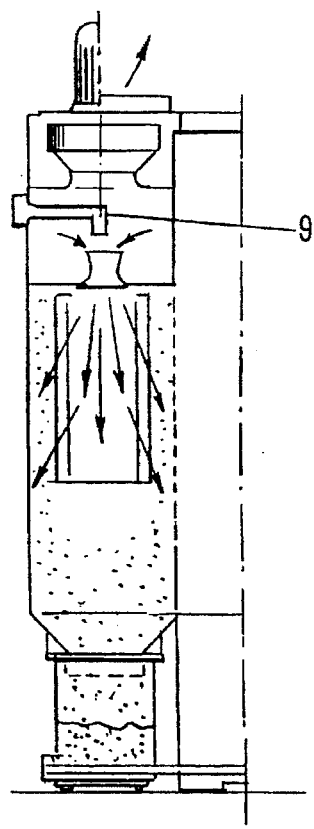
FIG. 2 shows a cleaning step.

This reversal of the air stream is achieved by blowing air through the jet 9 from the top into the filter 7. This cleaning step is schematically represented in FIG. 2.

The shown device which blows the release agent simultaneously onto the interior and exterior surfaces of the green tire is preferably operated with identical powder mixtures for both sides. In this manner, the powder collected within the container 8 can be recycled to the powder jets 4 and 5.

The invention allows for a considerable reduction of environmental pollution with only a minimal increase of production costs and without negatively effecting the quality of the finished product.

The present invention is, of course, in no way restricted to the specific disclosure of the specification and drawings, but also encompasses any modifications within the scope of the appended claims.

What we claim is:

1. A method of manufacturing a rubber article, said method comprising the steps of:
   a) shaping a green article;
   b) producing a vulcanized rubber powder from rubber mixtures containing anti-aging compounds but being free of fibers and butyl rubber;
   c) preparing a first solvent-free powdery release agent comprised of powder particles, the first release agent comprising
      1) at least 10% of said vulcanized rubber powder and
      2) a compound preventing rubber adhesion of the rubber powder particles within the first release agent;
   d) blowing the solvent-free powdery release agent onto the green article in order to coat the green article with the first release agent;
   e) providing during blowing an electrostatic potential difference between the green article and the first release agent for driving the powder particles of the first release agent onto the green article;
   f) placing the green article coated with the first release agent into a vulcanization mold; and
   g) vulcanizing the green article.

2. A method according to claim 1, wherein the compound preventing rubber adhesion is silica gel.

3. A method according to claim 2, wherein the fist release agent comprises at least 2% silica gel and wherein a product of the percentage of silica gel and the surface area of the silica gel in m²/g is at least 500.

4. A method according to claim 3, wherein the silica gel has a surface area of at least 100 m²/g.

5. A method according to claim 4, wherein the silica gel has a surface area of 200–400 m²/g.

6. A method according to claim 1, wherein the step of blowing includes the step of applying the first release agent to the exterior surface of the green article and wherein the first release agent comprises at least 90% vulcanized rubber powder.

7. A method according to claim 1, wherein the step of preparing includes preparing a second solvent-free powdery release agent comprised of powder particles, the second release agent comprising 1) 5–30% of said vulcanized rubber powder and
2) a compound preventing rubber adhesion of the rubber powder particles within the first release agent; wherein the step of blowing includes the step of applying the second release agent to the interior surface of the green article.

8. A method according to claim 1, wherein the step of blowing includes the step of applying the first release agent to the interior surface of the green article and wherein the first release agent comprises 5–30% silica gel.

9. A method according to claim 1, wherein the step of blowing includes the step of applying the first release agent to the exterior surface of the green article and wherein the first release agent comprises up to 6% silica gel.

10. A method according to claim 1 wherein the first release agent further comprises at most 5% carbon black and at most 8% graphite.

11. A method according to claim 1, wherein the step of blowing includes the step of applying the first release agent to the exterior surface of the green article and wherein the first release agent comprises exclusively silica gel and vulcanized rubber powder and is free of carbon black and graphite.

12. A method according to claim 11, wherein the first release agent comprises up to 6% silica gel.

13. A method according to claim 1, wherein the step of blowing includes the step of applying the first release agent to the exterior surface and a second release agent to the interior surface of the green article, wherein the first release agent applied to the exterior surface has a composition that is different from the composition of the second release agent applied to the interior surface.

14. A method according to claim 13, wherein the first release agent applied to the exterior surface is free of mica.

15. A method according to claim 13, wherein the second release agent applied to the interior surface contains 15–50% mica.

16. A method according to claim 13, wherein the second release agent applied to the interior surface contains 15–50% talcum.

17. A method according to claim 13, wherein the second release agent applied to the interior surface contains mica and talcum in a combined amount of 15–50%.

18. A method according to claim 1, wherein the step of blowing includes the step of applying the first release agent to the exterior surface and a second release agent to the interior surface of the green article, wherein for applying the first release agent to the exterior surface a first jet is used and for applying the second release agent to the interior surface a second jet is used.

19. A method according to claim 18, wherein the first release agent applied to the exterior surface has a composition that is different from the composition of the second release agent applied to the interior surface.

20. A method according to claim 1, wherein blowing is carried out with a stream of gas.

21. A method according to claim 1, wherein blowing is carried out with a stream of air.

* * * * *